United States Patent [19]

Moriguchi et al.

[11] 3,900,330

[45] Aug. 19, 1975

[54] ZnO-B₂O₃-SiO₂ GLASS COATING COMPOSITIONS CONTAINING Ta₂O₅ AND A SEMICONDUCTOR DEVICE COATED WITH THE SAME

[75] Inventors: Toshiro Moriguchi; Kiyoshi Miwa; Takehiro Shibuya, all of Tokyo, Japan

[73] Assignee: Nippon Electric Glass Company, Limited, Tokyo, Japan

[22] Filed: Mar. 22, 1973

[21] Appl. No.: 343,642

[52] U.S. Cl. ............... 106/54; 117/201; 106/48
[51] Int. Cl. ......... C03c 3/08; C03c 3/30; C03c 7/00
[58] Field of Search ............... 106/54, 48; 117/201

[56] References Cited
UNITED STATES PATENTS

| | | | |
|---|---|---|---|
| 3,113,878 | 12/1963 | Martin | 106/54 |
| 3,392,312 | 7/1968 | Carman | 106/54 |
| 3,441,422 | 4/1969 | Graff | 106/54 |
| 3,505,571 | 4/1970 | DeVolder | 106/54 |
| 3,533,832 | 10/1970 | DeVolder | 106/54 |
| 3,752,701 | 8/1973 | Morrissey | 106/54 |

OTHER PUBLICATIONS

Berezhnoi, Glass Ceramics and Photositalls, Plenum Press, London, (1970), pp. 234–235.

*Primary Examiner*—Winston A. Douglas
*Assistant Examiner*—Mark Bell
*Attorney, Agent, or Firm*—Kurt Kelman

[57] ABSTRACT

A coating glass consists essentially, by weight, of 45 ~ 70% ZnO, 15 ~ 35% $B_2O_3$, 3.5 ~ 15% $SiO_2$, 0.1 ~ 25% $Ta_2O_5$. The total amounts of ZnO, $B_2O_3$, $SiO_2$ and $Ta_2O_5$ constitute at least 85% by weight of the total composition. The coating glass is suitable for coating and or sealing semiconductor elements. The coating glass may be used as an additive with ZnO less than 1% by weight.

4 Claims, 4 Drawing Figures

ZnO-$B_2O_3$-$SiO_2$ GLASS COATING COMPOSITIONS CONTAINING $Ta_2O_5$ AND A SEMICONDUCTOR DEVICE COATED WITH THE SAME

BACK-GROUND OF THE INVENTION

This invention relates to coating glass, and, more particularly, to glass being suitable for coating and/or sealing semiconductor devices.

In order to stabilize surface of a semiconductor element, to protect the element from the contamination by air and to prevent the performance of the element from deterioration, the element is coated at the surface thereof by a coating means for surface preservation, and is sealed in any sealing means, such as glass coating means, metallic case or other means.

A coating glass used for sealing a semiconductor element, or for surface preservation of the semiconductor element, is required to have a thermal expansion coefficient substantially equal to the semiconductor, and not to contain alkaline components, such as sodium ions, which effect adversely on the surface of the semiconductor element.

In prior arts, borosilicate glass has been usually employed as a coating glass for semiconductor elements.

While, a glass for coating a semiconductor element, is further required to present an excellent wettability to the semiconductor without development of any stress between the semiconductor and the coating glass adhered thereto in order to fully insure the seal and preservation of the element, because the semiconductor element, in particular, that including P-N junctions is so sensitive to the environmental atmosphere that the performance and reliability of the element may be readily varied.

A three component glass of ZnO—$B_2O_3$—$SiO_2$ has been known as a sealing glass.

The glasses, for example, borosilicate glass or ZnO—$B_2O_3$—$SiO_2$ glass, which have been used to coat semiconductor elements are not satisfactory in view of the wettability to semiconductor elements.

OBJECT OF THE INVENTION

An object of this invention is to provide a glass for coating the semiconductor element for surface preservation or glass sealing, while fully meeting the requirements as above described.

Another object of this invention is to provide a semiconductor device wherein a P-N junction has a higher inversed voltage and a less inversed leakage current, due to the employment of a novel coating glass.

Yet another object of this invention is to enlarge a vitrifying composition range of a ZnO—$B_2O_3$—$SiO_2$ system.

A further object of this invention is to provide a coating glass with delayed devitrification, hence, with excellent wettability to semiconductors, and with thermal expansion coefficient nearly equal to that of semiconductor, so that seal and surface preservation of semiconductor element may be fully realized.

Another object of this invention is to provide a heat crystallizable coating glass suitable for seal and surface preservation of the semiconductor element.

SUMMARY OF THE INVENTION

The coating glass according to this invention consists essentially, by weight, of 45 ~ 70% ZnO, 15 ~ 35% $B_2O_3$, 3.5 ~ 15% $SiO_2$ and 0.1 ~ 25% $Ta_2O_5$ and the total amounts of these four components constitutes at least 85% of the total composition.

A simiconductor device comprising a semiconductor element, in particular that including N-type substrate, coated with the noble coating glass has a higher inversed voltage and a less inversed leakage current at a P-N junction therein.

Such noble coating glass such as above described may be used as an admixture with ZnO less than 1 weight %. In the case, the admixture may develop, through a firing process, homogeneous crystal in the resulted glass coating. Thus the admixture may serve as a heat crystallizable glass.

BRIEF DESCRIPTION OF THE DRAWINGS

The other features and objects of this invention will be understood from following descriptions in relation to embodiments of this invention referring to the annexed drawings.

DETAILED DESCRIPTION OF PREFERED EMBODIMENTS

This invention attempts to add $Ta_2O_5$ into a three component glass system of ZnO—$B_2O_3$—$SiO_2$, so that the vitrifying range of the three component glass system may be enlarged, the performances, such as thermal expansion coefficient and wettability, may be improved, and the devitrification may be delayed.

On a surface of a semiconductor element on which the glass of this invention is coated, are induced positive electric charges as an effect of the addition of $Ta_2O_5$ into the three component glass system, and the inversed voltage of a P-N junction included in the semiconductor element is great, while the inversed leakage current of the P-N junction is little.

Figure 1:
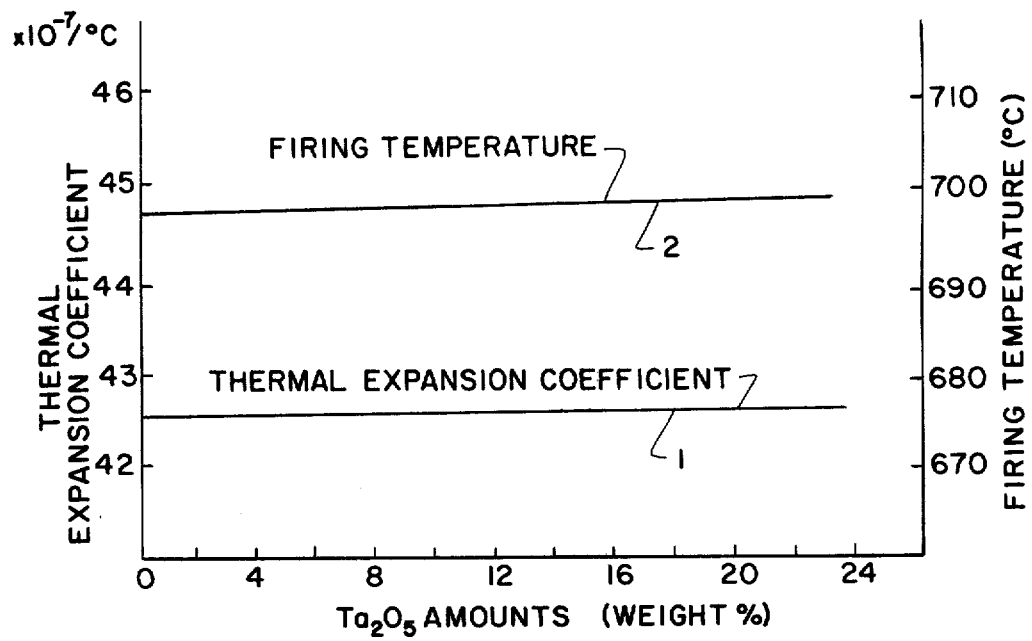
FIG. 1 shows variations of a thermal expansion coefficient and a firing temperature of the coating glass according to this invention in response to various amounts of $Ta_2O_5$ addition into the glass.
Figure 2:
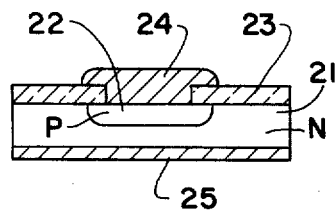
FIG. 2 shows a cross-sectional view of a diode, the surface of which is coated with a coating glass according to this invention.

FIG. 1 illustrates variations of the thermal expansion coefficient (in the temperature range 30 ~ 300°C) and the firing temperature of the glass material of three component glass consisted of 62.5 weight % ZnO, 10.0 weight % $SiO_2$ and 27.5 weight % $B_2O_3$, due to the addition of various amounts of $Ta_2O_5$ thereto. In FIG. 2, a curve 1 indicates a variation of the thermal expansion coefficient and the other curve 2 indicates a variation of the firing temperature.

It will be understood from FIG. 1 that the thermal expansion coefficient and the firing temperature are not so effected by the addition of $Ta_2O_5$ in the range of 0 ~ 24 weight %.

It has been found in our experiments that the addition of $Ta_2O_5$ into the ZnO—$B_2O_3$—$SiO_2$ system enlarges the vitrifying range of the three component glass system and surpresses the devitrifying speed.

FIG. 2 illustrates a cross sectional view of a diode, the surface of which is coated with a glass. The diode comprises a N-type substrate 21, a P-type diffusion region 22, coating glass layer 23, and metal electrodes 24 and 25.

When a three component glass consisting of 62.5 weight % ZnO, 10.0 weight % $SiO_2$ and 27.5 weight % $B_2O_3$ was used for the glass layer 23, the surface electric charge induced on a surface of the substrate 21 was negative, but upon addition of various amounts of $Ta_2O_5$ into the glass system, the induced surface electric charge was converted to be positive and increased in its density by the increase of the amount of $Ta_2O_5$.

Figure 3:
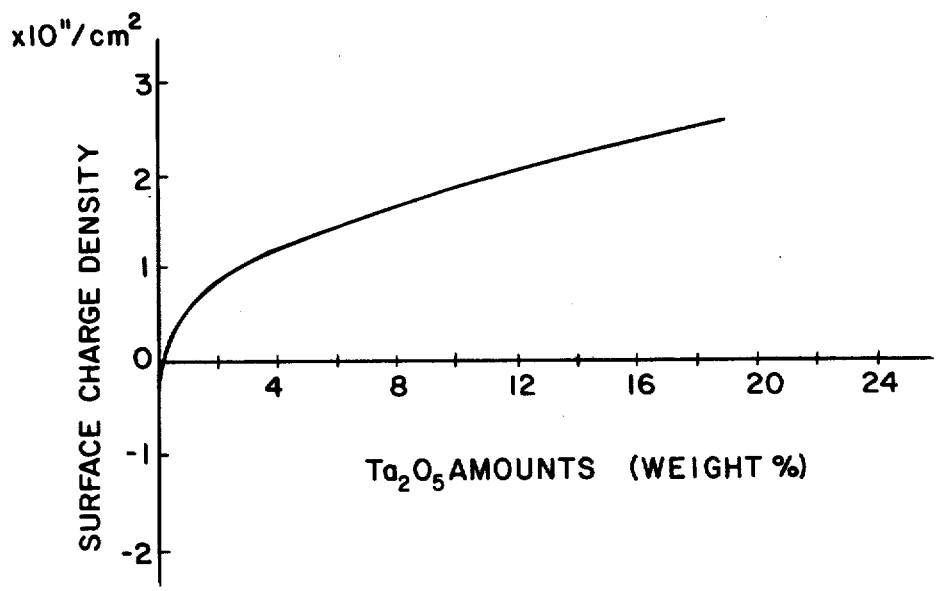
FIG. 3 shows variations of the surface electric charge density induced on the surface of the diode shown in FIG. 2 in response to various amounts of $Ta_2O_5$ in the coating glass.

The effect of addition of $Ta_2O_5$ into the three component glass system is illustrated in FIG. 3.

The surface electric charge density has been calculated from the measured voltage-capacity characteristic of each diode coated by the three component glass system in which $Ta_2O_5$ is added.

Figure 4:
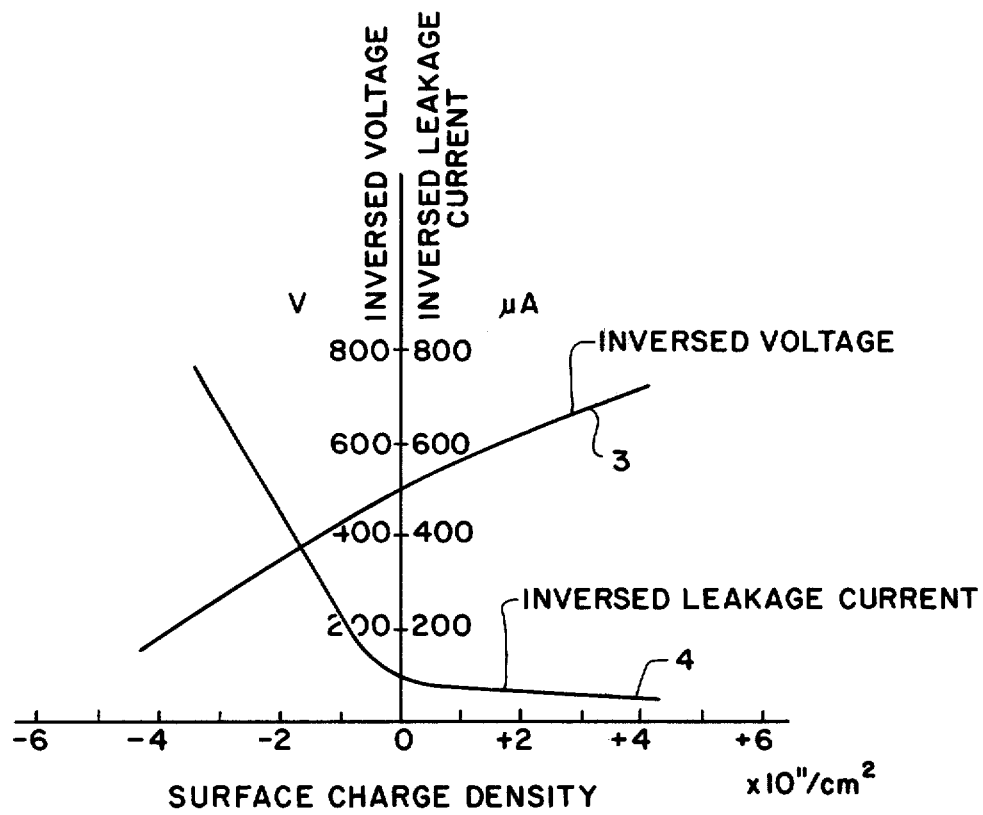
FIG. 4 shows variations of an inversed voltage and an inversed leakage current at a P-N junction of a diode the surface of which is coated by a coating glass, in response to various surface charge density induced on the surface of the diode.

FIG. 4 illustrates variations of an inversed voltage and an inversed leakage current of the diode in FIG. 2 in response to the various surface charge densities on the surface of the substrate. In FIG. 4, a curve 3 shows the variation of the inversed voltage and the other curve 4 shows the inversed leakage current at 500 V. The measuring was carried out at a temperature of 125°C, and relating to the use of the three component glass added $Ta_2O_5$ on the positive side of the surface charge density.

FIG. 4 teaches that, at an elevated temperature, the inversed voltage is higher with the inversed leakage current being lower, on the positive side of the surface charge density, and also, on the negative side in the extent of the absolute value of the surface charge density less than about $10^{10}/cm^2$.

From these results, it is appreciated to be desirable for the P-N junction having a N-type substrate that the surface charge density would be on the positive side or in the range less than the order of $10^{10}/cm^2$ in its absolute value on the negative side, and that $Ta_2O_5$ is added into the three component glass system.

The glass consisting of 62.5 weight % ZnO, 10.0 weight % $SiO_2$ and 27.5 weight % $B_2O_3$ has been used, hereinbefore, for the three component glass system, above descriptions were found to be generally available to all three component glasses of $ZnO—B_2O_3—SiO_2$ system.

In this invention, the coating glass is consisted essentially, by weight, of 47 ~ 70% ZnO, 15 ~ 35% $B_2O_3$, 3.5 ~ 15% $SiO_2$ and 0.1 ~ 25% $Ta_2O_5$, the total amounts of ZnO, $B_2O_3$, $SiO_2$ and $Ta_2O_3$ being constituted at least 85% of the total composition.

Above 70% ZnO, the glass is devitrified so rapidly in the firing process that the glass may not flow fully on the surface to be sealed. Accordingly, neither excellent wettability nor sealing may be realized. Below 45% ZnO, components readily decomposite during the melting and, therefore, a homogeneous glass cannot be formed.

It should be noted that, without addition of $Ta_2O_5$, devitrification is rapidly developed below 60%. As an effect of the addition of $Ta_2O_5$, the vitrifying range of the $ZnO—B_2O_3—SiO_2$ system has been enlarged.

If $B_2O_3$ is more than 35%, the glass has a great thermal expansion coefficient and is not suitable for coatings of semiconductor element, because the seal by the glass may be destroyed when the semiconductor element is exposed in temperature changes. Below 15% $B_2O_3$, the glass is rapidly devitrified, so that air-tight seal is hard to be realized.

When $SiO_2$ is above 15%, the glass devitrifies very rapidly in a firing process and, accordingly, is useless for a coating glass, below 3.5% $SiO_2$, the glass has no good wet-resistance.

When $Ta_2O_5$ exceeds 25%, the starting temperature for devitrification of the glass is too low to obtain a desirable glass seal. When $Ta_2O_5$ is less than 0.1%, the glass is not chemically stable. It should be noted that the surface charge density of a semiconductor element coated by the glass is small in its absolute value, as shown in FIG. 3. It should be noted that the transition point between negative and positive of the surface charge density corresponds to about 0.1% $Ta_2O_5$ in FIG. 3.

Twelve examples according to this invention are shown in Table I, in which, thermal expansion coefficients in a temperature range of 30 ~ 300°C and baking temperatures are, also, shown.

Table I

| Examples | 1 | 2 | 3 | 4 | 5 | 6 |
|---|---|---|---|---|---|---|
| ZnO | 59.1 | 54.2 | 60.7 | 59.5 | 48.1 | 56.8 |
| $B_2O_3$ | 25.0 | 22.9 | 26.7 | 26.2 | 21.1 | 29.6 |
| $SiO_2$ | 6.8 | 6.2 | 9.7 | 9.5 | 9.7 | 4.5 |
| $Ta_2O_5$ | 9.1 | 16.7 | 2.9 | 4.8 | 23.1 | 9.1 |
| Expansion coefficient ($\times 10^{-7}/°C$) | 43.0 | 43.2 | 42.9 | 42.6 | 42.1 | 44.0 |
| Firing temperature (°C) | 689 | 698 | 695 | 702 | 707 | 686 |

| | 7 | 8 | 9 | 10 | 11 | 12 |
|---|---|---|---|---|---|---|
| ZnO | 57.0 | 57.0 | 57.0 | 57.0 | 57.0 | 57.0 |
| $B_2O_3$ | 20.0 | 20.0 | 20.0 | 22.0 | 20.0 | 20.0 |
| $SiO_2$ | 13.0 | 13.0 | 13.0 | 11.0 | 10.0 | 13.0 |
| $Ta_2O_5$ | 5.0 | 5.0 | 5.0 | 5.0 | 3.0 | 5.0 |
| $CeO_2$ | 5.0 | | 2.0 | 3.0 | 3.5 | 2.0 |
| PbO | | 5.0 | 2.0 | 2.0 | 4.5 | 1.0 |
| $Bi_2O_3$ | | | 1.0 | | | |
| $Al_2O_3$ | | | | | 2.0 | 2.0 |
| Expansion coefficient ($\times 10^{-7}/°C$) | 43.0 | 43.0 | 42.0 | 42.0 | 43.0 | 42.0 |
| Firing temperature (°C) | 705 | 690 | 700 | 700 | 690 | 710 |

A batch so prepared as having each composition as shown in Table I was molten to grow completely vitrified and, thereafter, are pulverized to form powder masses. These steps of treatments must be operated very cautiously not to introduce the impurities of these compositions and the contaminations involved in the pulverizing step and particularly alkaline materials. The alkali concentration, especially sodium ion, should be less than 10 ppm after the pulverizing step.

The resulted glass powder was applied to the surface of P-N junction by the electrophoretic method and was fired, so that a thin glass layer of thickness of several microns to tens of microns is obtained. The obtained glass coating presented excellent sealing and the reliability of the semiconductor device was improved.

The firing temperatures should preferably be 50°C higher than those as shown in the above table 1.

The above-mentioned glass powder may be kneaded with distilled water or another medium and be applied thick onto the surface of semiconductor elements and, thereafter, may be fired to seal the surface thereof.

Coating glasses as above described are non-crystallizable glasses and are not crystallized at a firing process.

Generally, a non-crystallizable glass is superior to, in its flowability, but is inferior to, in its mechanical strength and life time to a heat crystallizable glass. In case a heat crystallizable glass is used for a coating glass for semiconductor device, cracking of the coating glass may be prevented at the time when the semiconductor chip is severed, and furthermore, the variations of surface charge density may be suppressed by an effect of the existence of numeral small crystals in a coating glass.

Accordingly, it will be understood that the heat crystallizable glass is used as a coating glass for semiconductor elements, in view of the mechanical strength of the coating and the stability of semiconductor surface.

The coating glass according to this invention, or the glass consisting essentially, by weight, of 45 ~ 70% ZnO, 15 ~ 35% $B_2O_3$, 3.5 ~ 15% $SiO_2$, and 0.1 ~ 25% $Ta_2O_5$, the total amounts of ZnO, $B_2O_3$, $SiO_2$ and $Ta_2O_5$ constituting at least 85% of the total composition, may be added ZnO less than 1% by weight, to convert the coating glass into a heat crystallizable glass.

Each glass powder having a composition shown in the Table I was mixed with ZnO uniformly, applied onto a semiconductor element, and, thereafter, fired. As a result, a thin glass coating layer having numerous small crystals was developed. The glass characteristic of the powder glass and the performance of the semiconductor element were not badly affected. When the mixed ZnO exceeds 1%, the flowability of the glass was reduced, so that the wettability of the glass to a semiconductor surface was inferior.

What we claim is:

1. A glass coating composition consisting of, by weight, 45–70% ZnO, 15–35% $B_2O_3$, 3.5–15% $SiO_2$ and 0.1–25% $Ta_2O_5$, said coating composition when disposed on a semiconductor device having the capacity to induce positive electric charges on the surface of said device.

2. A glass coating composition admixture of glass powder and an oxide powder wherein said glass powder consists of, by weight, 45–70% ZnO, 15–35% $B_2O_3$, 3.5–15% $SiO_2$ and 0.1–25% $Ta_2O_5$, said oxide powder being less than 1 weight % ZnO of said admixture, said coating composition when disposed on a semiconductor device having the capacity to induce positive electric charges on the surface of said device.

3. A semiconductor device coated with the glass coating composition of claim 1.

4. A semiconductor device coated with the glass coating composition admixture of claim 2.

* * * * *

UNITED STATES PATENT OFFICE
CERTIFICATE OF CORRECTION

PATENT NO. : 3,900,330
DATED : Aug. 19, 1975
INVENTOR(S) : Toshiro Moriguchi et al It is certified that error appears in the above-identified patent and that said Letters Patent are hereby corrected as shown below:

In the heading, at [73], line 2, after "Limited," insert
--Otsu-shi, Japan, and Nippon Electric Company, Limited,--

Signed and Sealed this sixteenth Day of March 1976

[SEAL]

Attest:

RUTH C. MASON
Attesting Officer

C. MARSHALL DANN
Commissioner of Patents and Trademarks